(12) United States Patent
Iwakiri et al.

(10) Patent No.: US 8,463,104 B2
(45) Date of Patent: Jun. 11, 2013

(54) DIGITAL BROADCAST RECEIVING APPARATUS AND METHOD FOR CONTROLLING THE SAME

(75) Inventors: Yoshiki Iwakiri, Kawasaki (JP); Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 366 days.

(21) Appl. No.: 13/009,730

(22) Filed: Jan. 19, 2011

(65) Prior Publication Data
US 2011/0182562 A1    Jul. 28, 2011

(30) Foreign Application Priority Data

Jan. 25, 2010  (JP) ................. 2010-013638

(51) Int. Cl.
*H04N 9/80*    (2006.01)
(52) U.S. Cl.
USPC ....................................... 386/241
(58) Field of Classification Search
USPC ............................... 386/200, 241
See application file for complete search history.

(56) References Cited

FOREIGN PATENT DOCUMENTS

JP    2002-328867    11/2002

OTHER PUBLICATIONS

Association of Radio Industries and Businesses, "Application Execution Engine Platform for Digital Broad Casting," ARIB STD-B23, Version 1.1, (2003).

*Primary Examiner* — Huy T Nguyen
(74) *Attorney, Agent, or Firm* — Fitzpatrick, Cella, Harper & Scinto

(57) ABSTRACT

There is provided a digital broadcast receiving apparatus comprising an acceptance unit and a change unit. Subsidiary information includes application control information indicating "finishing" or "not finishing" the execution of a data broadcast application by an execution unit when a program included in broadcast program data in playback by a playback unit has been switched to another program. The acceptance unit is configured to accept a continuation instruction indicating continuing the execution of the data broadcast application by the execution unit even after a program included in the broadcast program data in playback by the playback unit is finished. The change unit is configured to, when the application control information has indicated "finishing" and the acceptance unit has accepted the continuation instruction, change the application control information so as to indicate "not finishing" before the program included in the broadcast program data in playback by the playback unit is finished.

8 Claims, 13 Drawing Sheets

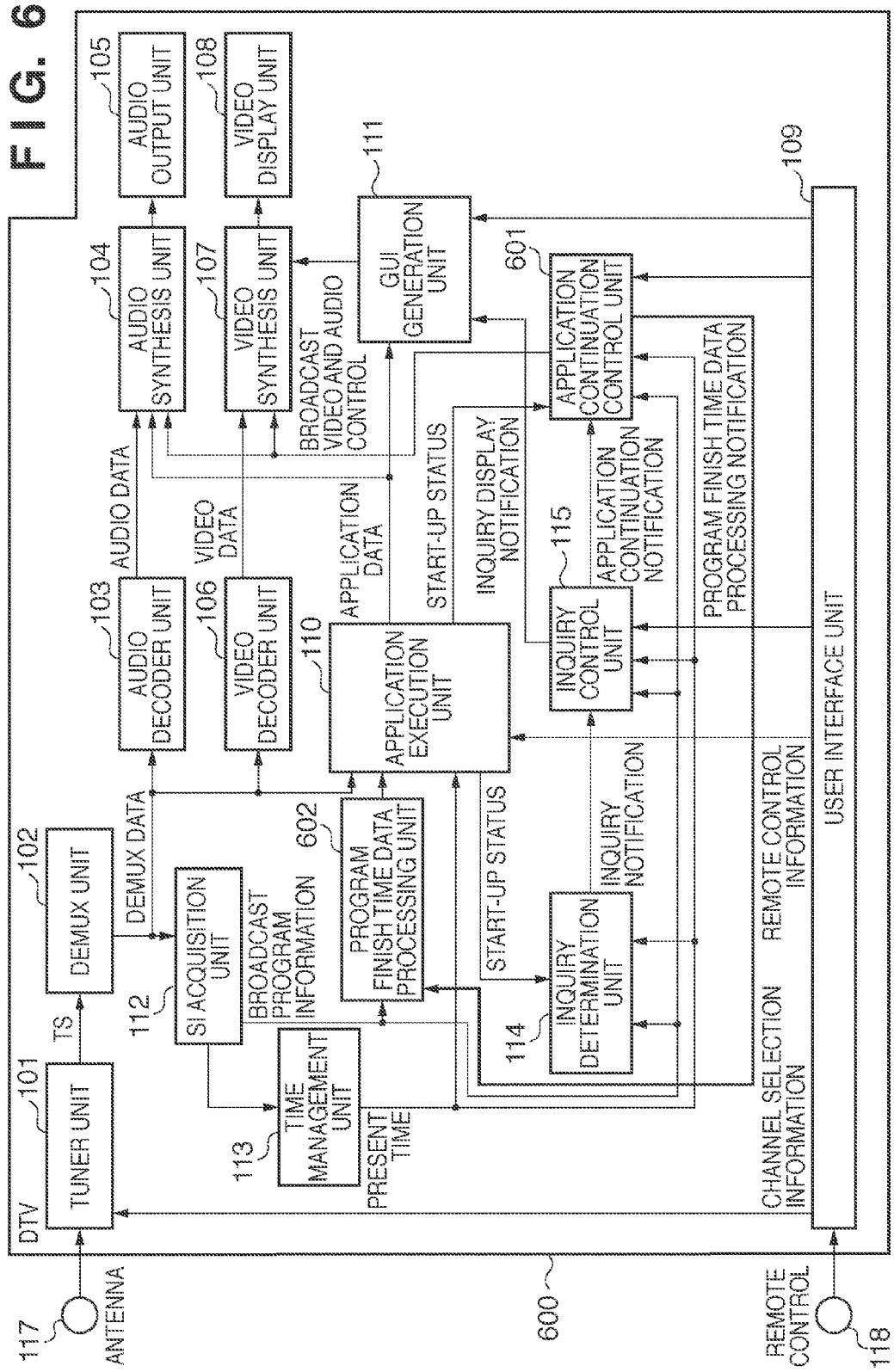

DIGITAL BROADCAST RECEIVING APPARATUS AND METHOD FOR CONTROLLING THE SAME

BACKGROUND OF THE INVENTION

1. Field of the Invention

The present invention relates to a digital broadcast receiving apparatus and a method for controlling the apparatus.

2. Description of the Related Art

As a system for implementing a data broadcasting service, a system is known which is referred to as ARIB-J utilizing a Java®-based application (data broadcast application) (see ARIB (the Association of Radio Industries and Business) STD-B23, "Application Execution Engine Platform for Digital Broad Casting"). In ARIB-J, two schemes are defined—a bound application scheme linked to broadcast programs and an unbound application scheme unlinked to broadcast programs. In the bound application scheme, it is specified that when broadcast program switching has been performed during the execution of a data broadcast application, the data broadcast application execution is finished.

As a technique of making it possible to continuously use contents that are in use, a technique is known which is disclosed in Japanese Patent Laid-Open No. 2002-328867. In Japanese Patent Laid-Open No. 2002-328867, when updated contents have been received during the use of contents, a receiving apparatus replaces the original contents with the updated contents after the use of the original contents is finished.

Although the case where contents are updated is considered in Japanese Patent Laid-Open No. 2002-328867, the case where broadcast programs are finished is not considered. Because of this, in the case where the bound application scheme is used, Japanese Patent Laid-Open No. 2002-328867 cannot satisfy users' demand that they want to further continuously use data broadcast applications after the finish of broadcast programs.

SUMMARY OF THE INVENTION

The present invention has been accomplished in view of such circumstances. Thus, the present invention provides a technique for making it possible to further continue the execution of a data broadcast application linked to a broadcast program after the finish of the program.

According to a first aspect of the present invention, there is provided a digital broadcast receiving apparatus comprising: a reception unit configured to receive broadcast program data including a data broadcast application and subsidiary information; a playback unit configured to playback the broadcast program data; and an execution unit configured to execute the data broadcast application, wherein the subsidiary information includes application control information indicating "finishing" or "not finishing" the execution of the data broadcast application by the execution unit when a program included in the broadcast program data in playback by the playback unit has been switched to another program, the digital broadcast receiving apparatus further comprising: an acceptance unit configured to accept a continuation instruction indicating continuing the execution of the data broadcast application by the execution unit even after a program included in the broadcast program data in playback by the playback unit is finished; and a change unit configured to, when the application control information has indicated "finishing" and the acceptance unit has accepted the continuation instruction, change the application control information so as to indicate "not finishing" before the program included in the broadcast program data in playback by the playback unit is finished.

According to a second aspect of the present invention, there is provided a digital broadcast receiving apparatus comprising: a reception unit configured to receive broadcast program data including a data broadcast application and subsidiary information; a playback unit configured to playback the broadcast program data; and an execution unit configured to execute the data broadcast application, wherein the subsidiary information includes: application control information indicating "finishing" or "not finishing" the execution of the data broadcast application by the execution unit when a program included in the broadcast program data in playback by the playback unit has been switched to another program; and time information indicating finish time of the program included in the broadcast program data, the digital broadcast receiving apparatus further comprising: an acceptance unit configured to accept a continuation instruction indicating continuing the execution of the data broadcast application by the execution unit even after a program included in the broadcast program data in playback by the playback unit is finished; and a change unit configured to, when the application control information has indicated "finishing" and the acceptance unit has accepted the continuation instruction, change the time information so as to indicate finish time advanced from the pre-changed finish time before the program included in the broadcast program data in playback by the playback unit is finished.

According to a third aspect of the present invention, there is provided a digital broadcast receiving apparatus comprising: a reception unit configured to receive broadcast program data including a data broadcast application and subsidiary information; a playback unit configured to playback the broadcast program data; and an execution unit configured to execute the data broadcast application, wherein the subsidiary information includes application control information indicating "finishing" or "not finishing" the execution of the data broadcast application by the execution unit when a program included in the broadcast program data in playback by the playback unit has been switched to another program, the digital broadcast receiving apparatus further comprising: an acceptance unit configured to accept a continuation instruction indicating continuing the execution of the data broadcast application by the execution unit even after a program included in the broadcast program data in playback by the playback unit is finished; and a control unit configured to, when the application control information has indicated "finishing" and the acceptance unit has accepted the continuation instruction, control the reception unit so as to halt the reception of the broadcast program data before the program included in the broadcast program data in playback by the playback unit is finished.

According to a fourth aspect of the present invention, there is provided a digital broadcast receiving apparatus comprising: a reception unit configured to receive broadcast program data including a data broadcast application and subsidiary information; a playback unit configured to playback the broadcast program data; and an execution unit configured to execute the data broadcast application, wherein the subsidiary information includes: application control information indicating "finishing" or "not finishing" the execution of the data broadcast application by the execution unit when a program included in the broadcast program data in playback by the playback unit has been switched to another program; and identifying information with which the program included in the broadcast program data is identified, the digital broadcast receiving apparatus further comprising: a notification unit configured to notify the execution unit of the identifying information; an acceptance unit configured to accept a continuation instruction indicating continuing the execution of the data broadcast application by the execution unit even after a program included in the broadcast program data in playback by the playback unit is finished; and a control unit configured to, when the application control information has indicated "finishing" and the acceptance unit has accepted the continuation instruction, control the notification unit so as to notify the execution unit of the identifying information of the program included in the broadcast program data in playback by the playback unit even after the program is finished.

According to a fifth aspect of the present invention, there is provided a method for controlling a digital broadcast receiving apparatus, the method comprising: a reception step of receiving broadcast program data including a data broadcast application and subsidiary information; a playback step of playbacking the broadcast program data; and an execution step of executing the data broadcast application, wherein the subsidiary information includes application control information indicating "finishing" or "not finishing" the execution of the data broadcast application at the execution step when a program included in the broadcast program data in playback at the playback step has been switched to another program, the controlling method further comprising: an acceptance step of accepting a continuation instruction indicating continuing the execution of the data broadcast application at the execution step even after a program included in the broadcast program data in playback at the playback step is finished; and a change step of, when the application control information has indicated "finishing" and the continuation instruction has been accepted at the acceptance step, changing the application control information so as to indicate "not finishing" before the program included in the broadcast program data in playback at the playback step is finished.

According to a sixth aspect of the present invention, there is provided a method for controlling a digital broadcast receiving apparatus, the method comprising: a reception step of receiving broadcast program data including a data broadcast application and subsidiary information; a playback step of playbacking the broadcast program data; and an execution step of executing the data broadcast application, wherein the subsidiary information includes: application control information indicating "finishing" or "not finishing" the execution of the data broadcast application at the execution step when a program included in the broadcast program data in playback at the playback step has been switched to another program; and time information indicating finish time of a program included in the broadcast program data, the controlling method further comprising: an acceptance step of accepting a continuation instruction indicating continuing the execution of the data broadcast application at the execution step even after a program included in the broadcast program data in playback at the playback step is finished; and a change step of, when the application control information has indicated "finishing" and the continuation instruction has been accepted at the acceptance step, changing the time information so as to indicate finish time advanced from the pre-changed finish time before the program included in the broadcast program data in playback at the playback step is finished.

According to a seventh aspect of the present invention, there is provided a method for controlling a digital broadcast receiving apparatus, the method comprising: a reception step of receiving broadcast program data including a data broadcast application and subsidiary information; a playback step of playbacking the broadcast program data; and an execution step of executing the data broadcast application, wherein the subsidiary information includes application control information indicating "finishing" or "not finishing" the execution of the data broadcast application at the execution step when a program included in the broadcast program data in playback at the playback step has been switched to another program, the controlling method further comprising: an acceptance step of accepting a continuation instruction indicating continuing the execution of the data broadcast application at the execution step even after a program included in the broadcast program data in playback at the playback step is finished; and a control step of, when the application control information has indicated "finishing" and the continuation instruction has been accepted at the acceptance step, controlling the reception step so that the reception of the broadcast program data is halted before the program included in the broadcast program data in playback at the playback step is finished.

According to an eighth aspect of the present invention, there is provided a method for controlling a digital broadcast receiving apparatus, the method comprising: a reception step of receiving broadcast program data including a data broadcast application and subsidiary information; a playback step of playbacking the broadcast program data; and an execution step of executing the data broadcast application, wherein the subsidiary information includes: application control information indicating "finishing" or "not finishing" the execution of the data broadcast application at the execution step when a program included in the broadcast program data in playback at the playback step has been switched to another program; and identifying information with which the programs included in the broadcast program data are identified, the controlling method further comprising: a notification step of notifying the execution step of the identifying information; an acceptance step of accepting a continuation instruction indicating continuing the execution of the data broadcast application at the execution step even after a program included in the broadcast program data in playback at the playback step is finished; and a control step of, when the application control information has indicated "finishing" and the continuation instruction has been accepted at the acceptance step, controlling the notification step so that the execution step is notified of the identifying information of the program included in the broadcast program data in playback at the playback step even after the program is finished.

As can be seen from the above aspects, in this invention, the execution of a data broadcast application linked to a broadcast program can be further continued after the program is finished.

Further features of the present invention will become apparent from the following description of exemplary embodiments with reference to the attached drawings.

BRIEF DESCRIPTION OF THE DRAWINGS

FIG. 6 is a block diagram of a DTV 600 according to a second embodiment.

DESCRIPTION OF THE EMBODIMENTS

Some embodiments in which a digital broadcast receiving apparatus according to the present invention is applied to a digital television (DTV) will be described below with reference to the drawings. In the following embodiments, it is assumed that broadcasting program data received by each DTV includes data broadcasting applications unless otherwise specified. And further, "bound application" refers to a data broadcasting application linked to programs (i.e., exited at the time of program switching), and "unbound application" refers to a data broadcasting application unlinked to programs.

First Embodiment

In a first embodiment, the continuous execution of a data broadcasting application can be performed by changing the value of a service_bound_flag in an application information table (AIT) from "1", referring to a bound application, to "0", referring to an unbound application.

Figure 1:
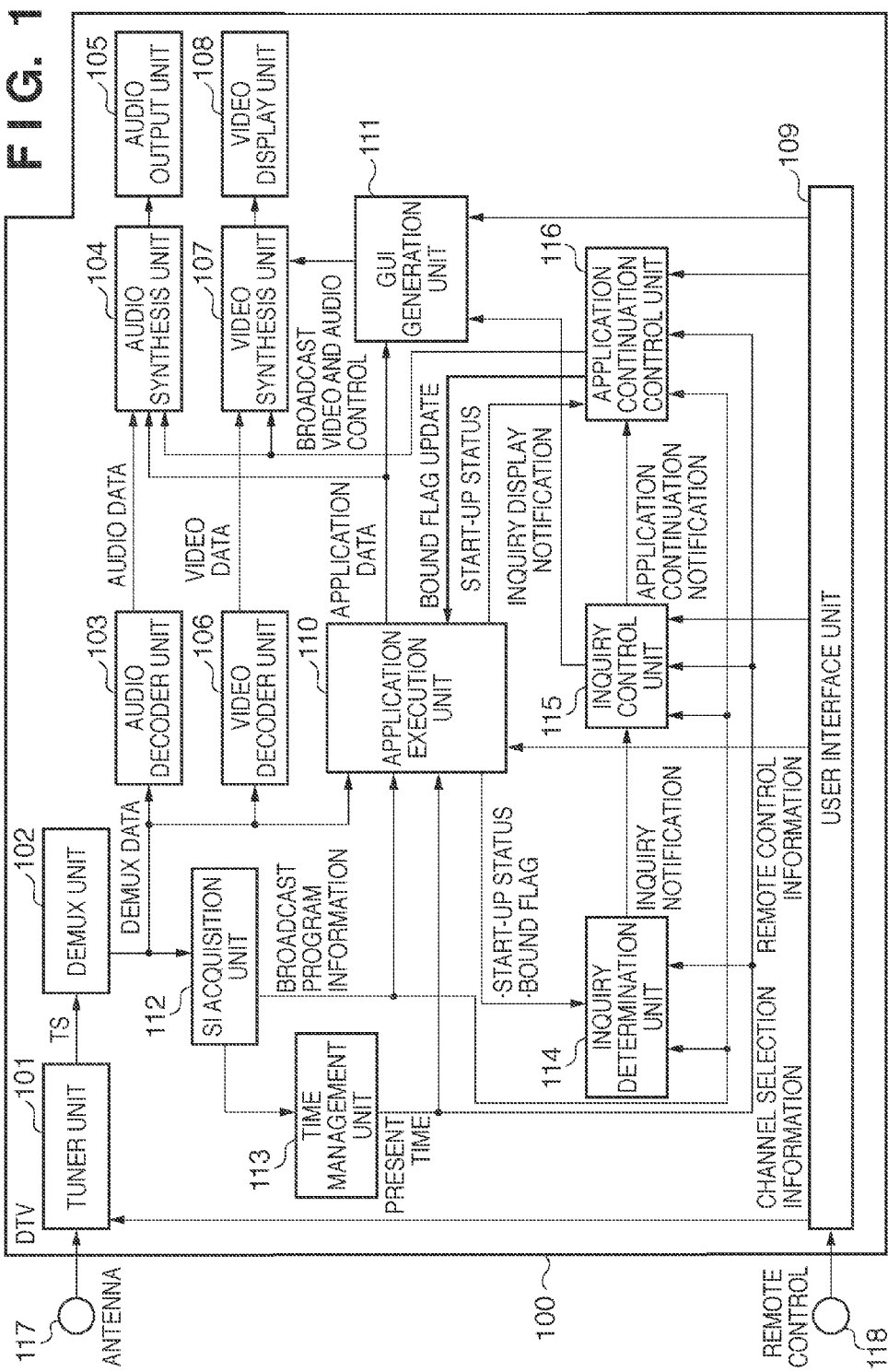
FIG. 1 is a block diagram of a digital television (DTV) 100 according to a first embodiment.

FIG. 1 is a block diagram of a DTV 100 according to the first embodiment. In FIG. 1, a tuner unit 101 acquires broadcast signals from an antenna 117. The tuner unit 101 extracts one of the broadcast signals according to channel selection information obtained from a user interface unit 109, and generates a transport stream (TS) therefrom as broadcast program data. Then the tuner unit 101 outputs the generated TS to a DEMUX unit 102.

The DEMUX unit 102 separates the TS obtained from the tuner unit 101 into PSI/SI (subsidiary information), an audio data stream, a video data stream, and a data broadcasting application (application program). Incidentally, PSI stands for program specific information, and SI stands for service information. The PSI includes packet ID (PID) information necessary to identify individual data; by using the PID information the audio data stream, the video data stream, and the application program can be separated from the TS. The DEMUX unit 102 transmits the separated audio data stream and video data stream to an audio decoder unit 103 and a video decoder unit 106, respectively. The DEMUX unit 102 further transmits the separated application program to an application execution unit 110. The SI includes broadcast program information including the titles, contents, and broadcast start and finish times of programs (program identifying information) and the present time-of-day information. The DEMUX unit 102 transmits the separated SI to a SI acquisition unit 112.

The application program is not a program previously held in the DTV 100, but a program included in the TS by the sender (broadcasting station) and transmitted by carousel transmission. The application program provides services linked to the video and audio of the programs. This program is in the Java® format, and information on the application program is presented in the application information table (AIT). One example of the AIT is as follows.

```
AIT(ApplicationInformationTable)
{
    application_type = 0x0001 (=ARIB-J)
    App#1{
        application_identifier( );
        application_descriptor( ){
            ...
            service_bound_flag;
            ...
        }
    }
    App#2{
        ...
        application_descriptor( ){
            ...
        }
    }
}
```

The AIT provides information as to each application included in the TS. In the above example, information as to two applications is provided. "Application_identifier ( )" is an application identifier that uniquely identifies the applications. In "application_descriptor ( )", operation at the time of service switching, the priorities of the applications, and so on are presented, and "service_bound_flag" is set.

The service_bound_flag represents information indicating either that the application is a bound application or that the application is an unbound application (i.e., represents application control information). When the service_bound_flag is set at "0", the application program is an unbound application, and thus the execution of the program is not finished at the time of service switching. In contrast, when the service_bound_flag is set at "1", the application program is a bound application, and thus the execution must be finished concurrently with service switching. Service switching refers to the changing of the program in view either by channel switching or finishing of the program. In other words, the service_bound_flag represents "finishing" or "not finishing" application program execution at the DTV 100 when switching from a program in playback has been performed. And further, when a program has finished during the execution of an application program represented by the service_bound_flag of "1", the execution of the application program is finished even in the case where the user wants to continue the execution.

Referring back to FIG. 1, the audio decoder unit 103 decodes the audio data stream obtained from the DEMUX unit 102, and transmits the resulting audio data to an audio synthesis unit 104. The audio synthesis unit 104 synthesizes the broadcast audio data obtained from the audio decoder unit 103 and application audio data obtained from the application execution unit 110, and transmits the resulting data to an audio output unit 105.

The video decoder unit 106 decodes the video data stream obtained from the DEMUX unit 102, and transmits the resulting video data to a video synthesis unit 107. The video synthesis unit 107 synthesizes the broadcast video data obtained from the video decoder unit 106 and GUI data obtained from a GUI generation unit 111, and transmits the resulting data to a video display unit 108.

The user interface unit 109 receives remote control information transmitted by pressing a button on a remote control 118, and performs processing corresponding to the remote control information. For example, when remote control information regarding channel selection is received by using the remote control 118, the user interface unit 109 transmits the channel selection information to the tuner unit 101. And further, when remote control information regarding application operation is received, the user interface unit 109 transmits the contents of the remote control information to the application execution unit 110. Furthermore, when remote control information regarding a response to an inquiry addressed to the user is received, the user interface unit 109 transmits the contents of the remote control information to the GUI generation unit 111.

Figure 2:
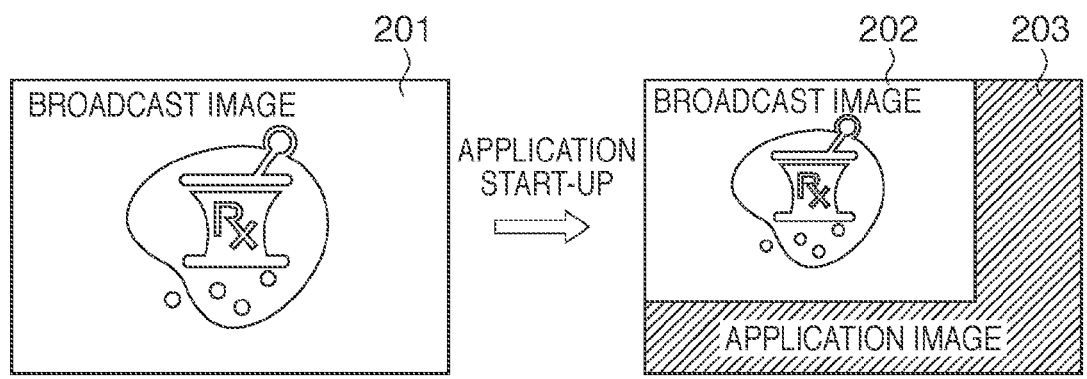
FIG. 2 is an illustration of screens before and after the start of an application program.

The application execution unit 110 acquires AIT information from the DEMUX unit 102, and stores the information in a storage region inside itself. The application execution unit 110 acquires remote control information from the user interface unit 109, and performs processing corresponding to the remote control information. For example, when having received an instruction to start (run) an application program from the remote control 118, the application execution unit 110 starts the application program. FIG. 2 is an illustration of screens before and after the start of the application program. When the application program has been started, the DTV 100 narrows a broadcast image 201 down to a broadcast image 202; that is, by shaping an application image 203 into a letter L, both the broadcast image 202 and the application image 203 are displayed. The layout of the application image 203 is depicted in the application program. Note that the layout of the application image 203 is not limited to that shown in FIG. 2, and thus any layout can be performed, as long as the layout corresponds to an application program provided to the DTV 100. Processing by the application execution unit 110 after the application program execution will be described later.

The GUI generation unit 111 acquires video data included in the application program from the application execution unit 110, and generates graphic data for video display. Also, when an inquiry display notification from an inquiry control unit 115 is received, the GUI generation unit 111 generates graphic data for addressing an inquiry to the user. Details on the inquiry display will be described later. The GUI generation unit 111 transmits the generated graphic data to the video synthesis unit 107.

The SI acquisition unit 112 acquires the SI from the DEMUX unit 102, and generates data as to the finish time of a currently tuned program (a program finish time). The program finish time data can be obtained from "start_time and duration data" in an event information table (EIT) included in the SI. "Start_time" refers to the time when each program begins, and "duration" refers to the length of time that each program is broadcast for. Therefore the finish time of the program refers to a time at which some duration of time has elapsed from a start_time. The SI acquisition unit 112 transmits the generated program finish time data to the application execution unit 110, an inquiry determination unit 114, the inquiry control unit 115, and an application continuation control unit 116. And further, the SI acquisition unit 112 acquires time offset table (TOT) data included in the SI, and transmits the data to a time management unit 113. The TOT gives the present date and time; dates and times are information included in TSs at intervals of 30 seconds.

The time management unit 113 acquires the TOT data from the SI acquisition unit 112. The time management unit 113 generates data as to the present time by keeping time in a manner that determines correct times based on the acquired TOT data. The time management unit 113 transmits the generated present time data to the application execution unit 110, the inquiry determination unit 114, the inquiry control unit 115, and the application continuation control unit 116. By comparing the program finish time data and the present time data acquired by the SI acquisition unit 112 and the time management unit 113, it becomes possible to determine how many seconds there are until the finish of the program and to detect the finish of the program.

Figure 3:
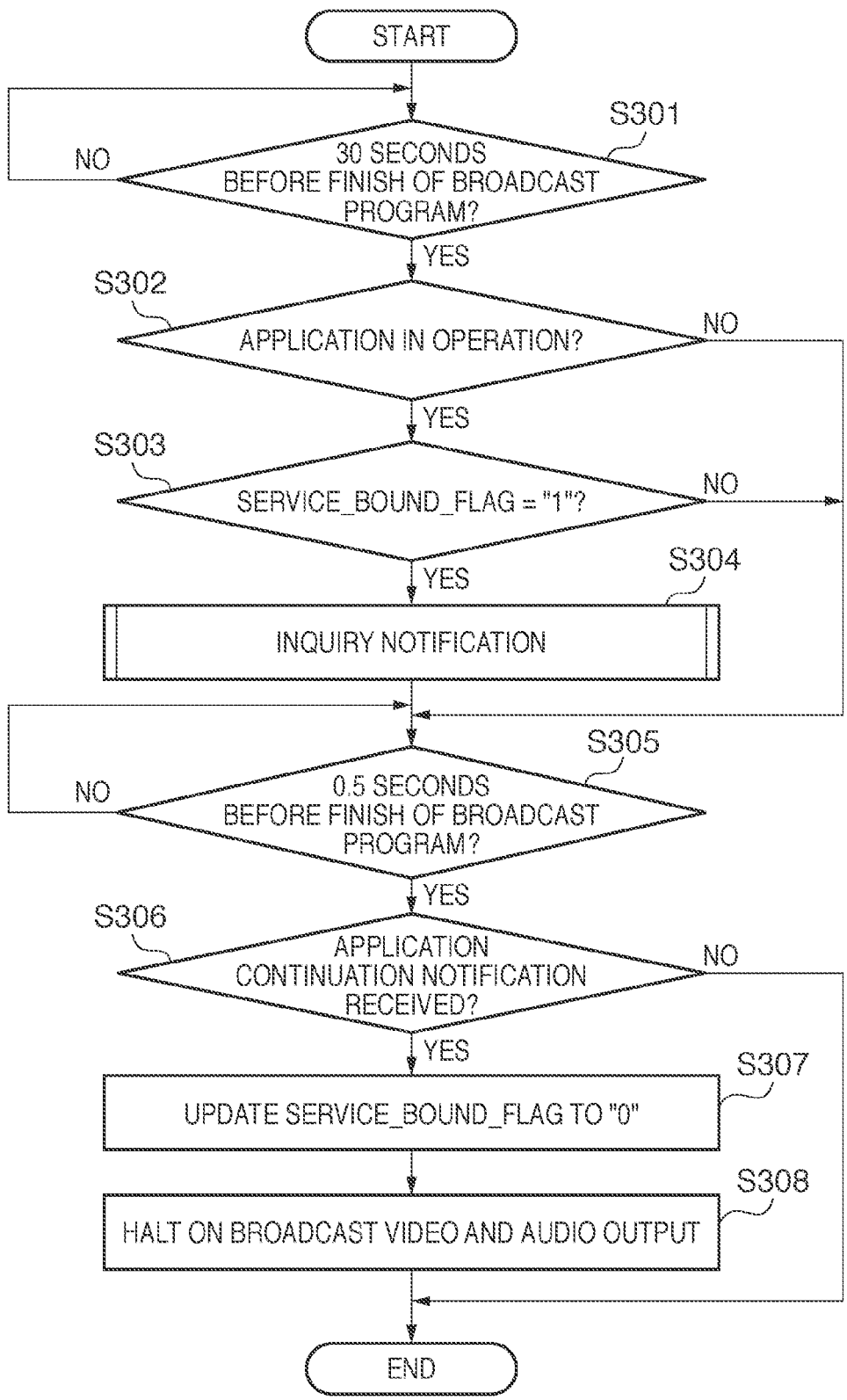
FIG. 3 is a flowchart illustrating application program continuation processing according to the first embodiment.

FIG. 3 is a flowchart illustrating application program continuation processing according to the first embodiment. When the playback of a program has been started, the inquiry determination unit 114 starts the processing shown by this flowchart.

At step S301, the inquiry determination unit 114 acquires program finish time data from the SI acquisition unit 112, and acquires the present time data from the time management unit 113, and determines whether or not it is 30 seconds from the present time until the finish time of the program. When it is 30 seconds from the present time until the finish time of the program, the processing goes to step S302.

At step S302, the inquiry determination unit 114 acquires data as to the start-up status of the application program from the application execution unit 110 to determine whether the application program is in operation or not. When being in operation, the processing goes to step S303; when not being in operation, the processing goes to step S305.

At step S303, the inquiry determination unit 114 acquires service_bound_flag data from the application execution unit 110 to determine whether the service_bound_flag is set at 1 or not. When the service_bound_flag is set at 1, the processing goes to step S304; when the flag is not set at 1, the processing goes to step S305.

Figure 4:
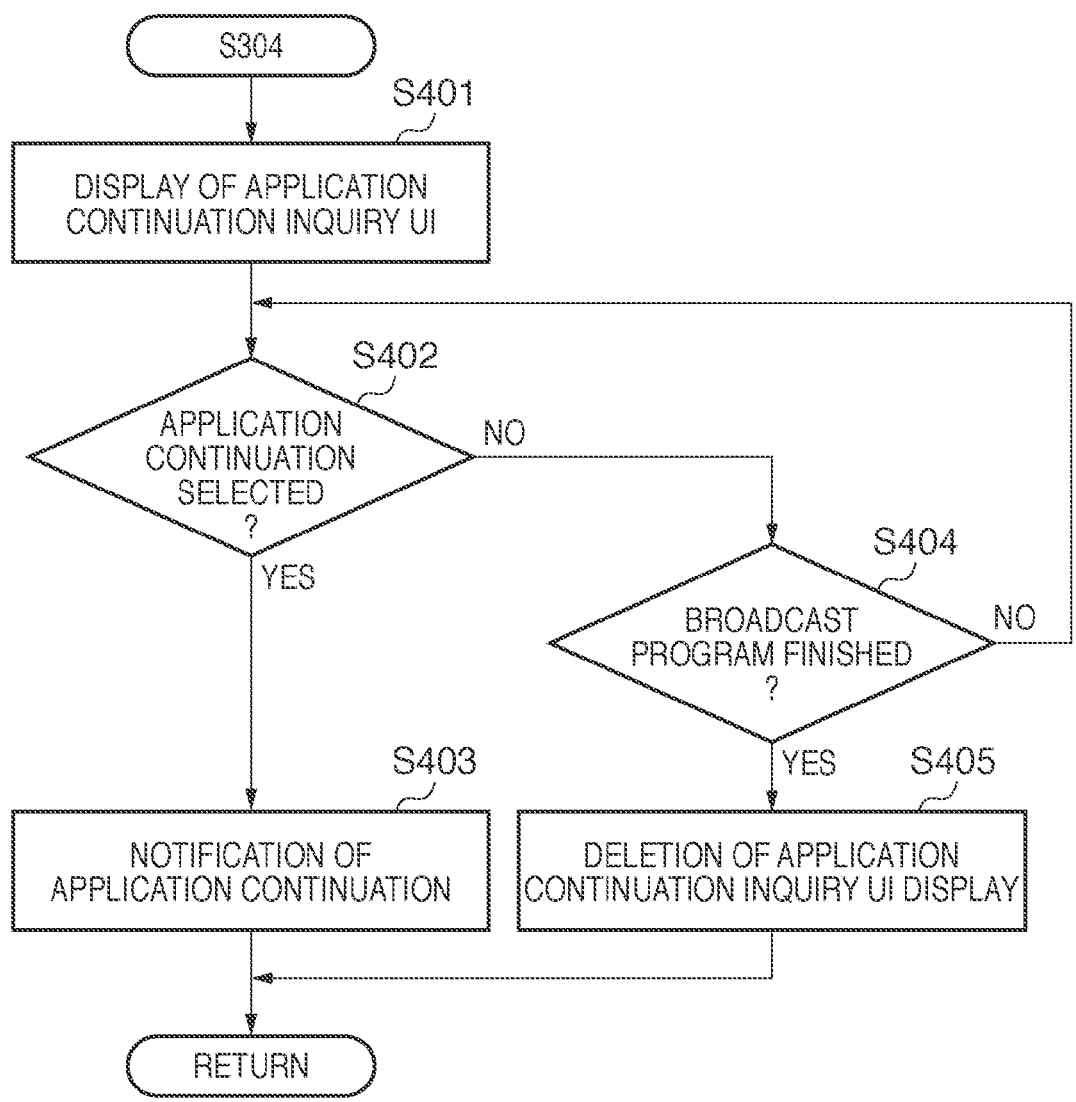
FIG. 4 is a detailed flowchart illustrating processing at step S304.

At step S304, the inquiry control unit 115 inquires of the user whether or not he/she continues the application program execution. FIG. 4 is a detailed flowchart illustrating the processing at step S304.

Figure 5A:
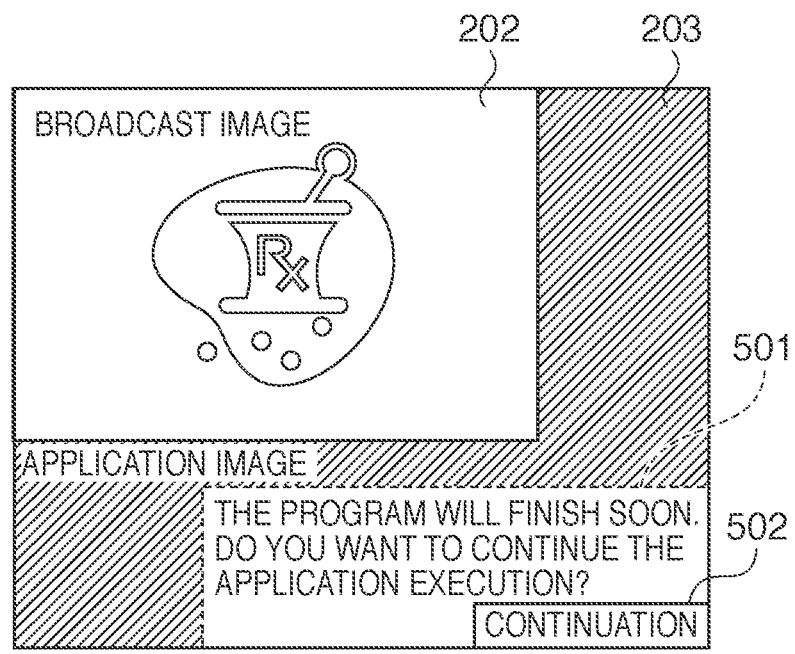
FIG. 5A is an illustration of an application continuation inquiry UI display screen.

At step S401, the inquiry control unit 115 issues an instruction as to an application continuation inquiry UI display to the GUI generation unit 111. When the instruction regarding the application continuation inquiry UI display is received, the GUI generation unit 111 generates graphic data to be displayed on the video. FIG. 5A is an illustration of a screen on which the application continuation inquiry UI image is displayed. In FIG. 5A, the identical or similar components to those of FIG. 2 are represented by using the same reference numerals, and their descriptions are omitted. As can be understood from the determination at step S301, when it is 30 seconds until the finish of the program, an application continuation inquiry UI image 501 is displayed. The application continuation inquiry UI image 501 comprises a sentence image that "The program will finish soon. Do you want to continue the application execution?" and a continuation button 502. Note that the layout of the application continuation inquiry UI image 501 is not limited to that in FIG. 5A; any layout may be possible, as long as there are the function of sending a notification that the application execution will finish soon and the function of inquiring of the user whether he/she wishes to continue the application execution or not.

At step S402, the inquiry control unit (reception unit) 115 determines whether or not the instruction to continue the application program execution (the instruction for the continuation) has been received. When the user has selected and pressed the continuation button 502 in the application continuation inquiry UI image 501 through the operation of the remote control, it is determined that the continuation instruction has been received. When the application continuation has been determined (when the continuation instruction has been taken), the processing goes to step S403; when the continuation has been halted, the process goes to step S404.

At step S403, the inquiry control unit 115 sends a notification of the application execution continuation to the application continuation control unit 116. On the other hands, at step S404, the inquiry control unit 115 compares the program finish time and the present time to determine whether the broadcast program is finished or not. When the program is finished (that is, when the program is finished without selecting to continue the application execution), the processing goes to step S405. If the program is not finished, the processing returns to step S402. At step S405, the inquiry control unit 115 instructs the GUI generation unit 111 to halt the display of the application continuation inquiry UI image 501.

After the steps S403 or S405, the processing goes to step S305 in FIG. 3. At step S305, the application continuation control unit 116 determines whether or not the present time is 0.5 seconds before the program finish time. When the present time is 0.5 seconds before the program finish time, the processing goes to step S306.

At step S306, the application continuation control unit 116 determines whether or not the notification of the application continuation described with reference to step S403 has been received. When the notification has been received, the processing goes to step S307. When no notification has been received (that is, when the application program is not in operation at step S302, or when the user did not issue an instruction as to the continuation at step S402, for example), the processing shown by the flowchart is finished.

At step S307, the application continuation control unit 116 issues a notification of the updating of the bound flag to the application execution unit 110 to update the service_bound_flag to "0." The service_bound_flag set at the value of "0" indicates "not finishing" the application program execution at the DTV 100 when switching to another broadcast program has been performed. Therefore, application exit processing, which is to be performed by the application execution unit 110 at the time of the finish of the broadcast program if the service_bound_flag is set at "1", is skipped. The service_bound_flag is updated 0.5 seconds before the finish of the broadcast program for the following two merits. First, since no processing is performed until it becomes necessary to update the service_bound_flag, a reduced process load is achieved. Second, video and audio data can be buffered at the video synthesis unit 107 and the audio synthesis unit 104 respectively such that the data does not include data on the next program. In this embodiment, the update is performed 0.5 seconds before the finish of the broadcast program in view of the two merits; however, the timing of updating the service_bound_flag is not particularly limited.

At step S308, the application continuation control unit 116 issues a notification of a halt on a broadcast data output to the video synthesis unit 107 and the audio synthesis unit 104. When the notification of the halt on the broadcast data output is received, the video synthesis unit 107 performs control not to output video data obtained from the video decoder unit 106 to the video display unit 108. When the notification of the halt on the broadcast data output is received, the audio synthesis unit 104 performs control not to output audio data obtained from the audio decoder unit 103 to the audio output unit 105.

Figure 5B:
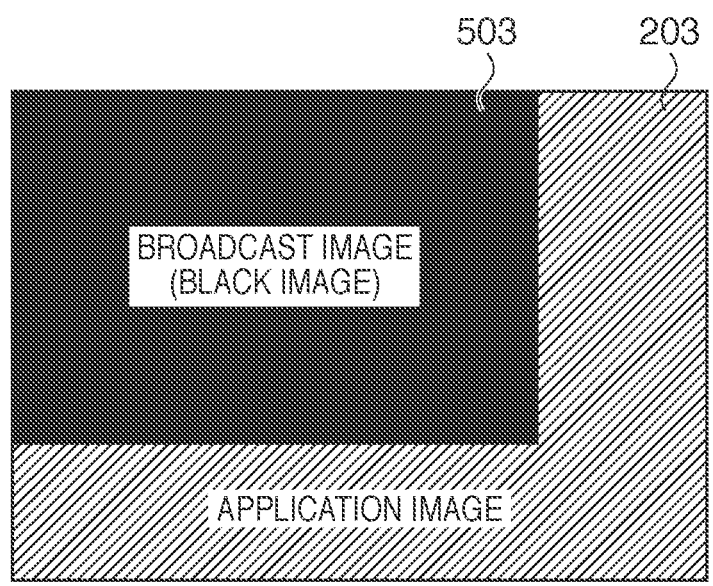
FIG. 5B is an illustration of a display screen created when the execution of the application program has been further continued after the finish of a broadcast program.

FIG. 5B is an illustration of a screen displayed in the case where the execution of the application program has been further continued after the finish of the broadcast program. In FIG. 5B, the identical or similar components to those of FIG. 5A are represented by using the same reference numerals, and their descriptions are omitted. Since the video synthesis unit 107 has halted the output of the broadcast data, a black image is displayed as a broadcast image 503. And further, although not shown, the audio of the broadcast program is not outputted but only the audio of the application program is outputted because the audio synthesis unit 104 has halted the output of the broadcast data.

The status of the display of FIG. 5B is continued until the user issues an instruction for the exit of the application program by operating the remote control 118 (or until a timeout or the like occurs). The application execution unit 110, when the instruction for the exit via the user interface unit 109 is received, starts application exit processing. That is, the application execution unit 110 exits the application program in execution, and deletes the data of the application program from the memory. And further, the application execution unit 110 sends a notification about the exit of the application program to the application continuation control unit 116. The application continuation control unit 116, when having received the application exit notification, sends a notification about the resumption of the broadcast data output to the video synthesis unit 107 and the audio synthesis unit 104. The video synthesis unit 107, when having received the broadcast data output resumption notification, resumes outputting the video data obtained from the video decoder unit 106 to the video display unit 108. The audio synthesis unit 104, when having received the broadcast data output resumption notification, resumes outputting the audio data obtained from the audio decoder unit 103 to the audio output unit 105.

As described above, in this embodiment, when the service_bound_flag is "1" and the user wants to continue the execution of a data broadcast application program, the application continuation control unit switches the service_bound_flag to "0" before the finish of a broadcast program.

As a result, the execution of the data broadcast application linked to the broadcast program can be further continued after the finish of the broadcast program.

Note that timing when the user determines whether or not he/she continues the execution of an application program is not limited to the point in time indicated in FIG. 3. For example, the user can previously determine whether or not he/she continues the execution of an application program via a menu screen (not shown). In this case, the inquiry control unit 115 receives a notification of the determination, and stores the determined information in, for example, the flash memory (not shown) of the DTV 100. And further, processing at steps S301 to S304 in FIG. 3 is not executed, and the application continuation control unit 116 reads the determined information from the flash memory at step S306, following which when the setting of continuing the execution of the application program is made, the process goes to step S307.

Second Embodiment

In a second embodiment, by processing data on the finish time of a broadcast program to simulatively delay the finish of the program, a data broadcast application program can be executed continuously. FIG. 6 is a block diagram of a DTV 600 according to the second embodiment. In FIG. 6, the identical or similar components to those of FIG. 1 are represented by using the same reference numerals, and their descriptions are omitted.

The DTV 600 is different from the DTV 100 in the following. First, the DTV 600 is provided with an application continuation control unit 601; however, the application continuation control unit 601 sends no notification about the updating of the bound flag to the application execution unit 110. Instead, the application continuation control unit 601 sends a notification about the processing of data on a broadcast program finish time to a program finish time data processing unit 602. Second, the DTV 600 is provided with the program finish time data processing unit 602.

Figure 7:
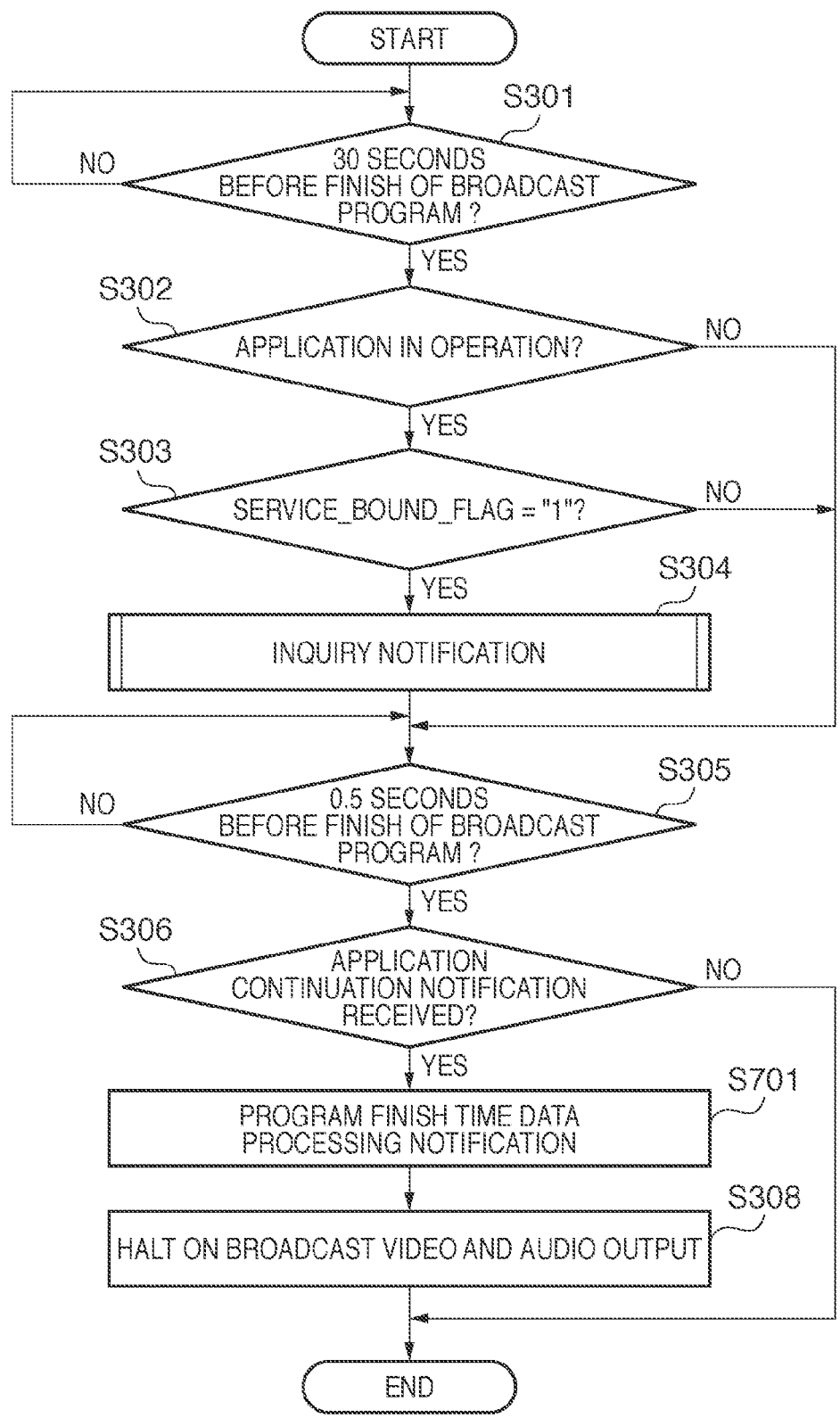
FIG. 7 is a flowchart illustrating application program continuation processing according to the second embodiment.

FIG. 7 is a flowchart illustrating application program continuation processing according to the second embodiment. In FIG. 7, steps at which the identical or similar processing to that in FIG. 3 is performed are represented by using the same step numbers, and the descriptions of the steps are omitted. At step S701, the application continuation control unit 601 sends a notification about the processing of data on a broadcast program finish time to the program finish time data processing unit 602.

Figure 8:
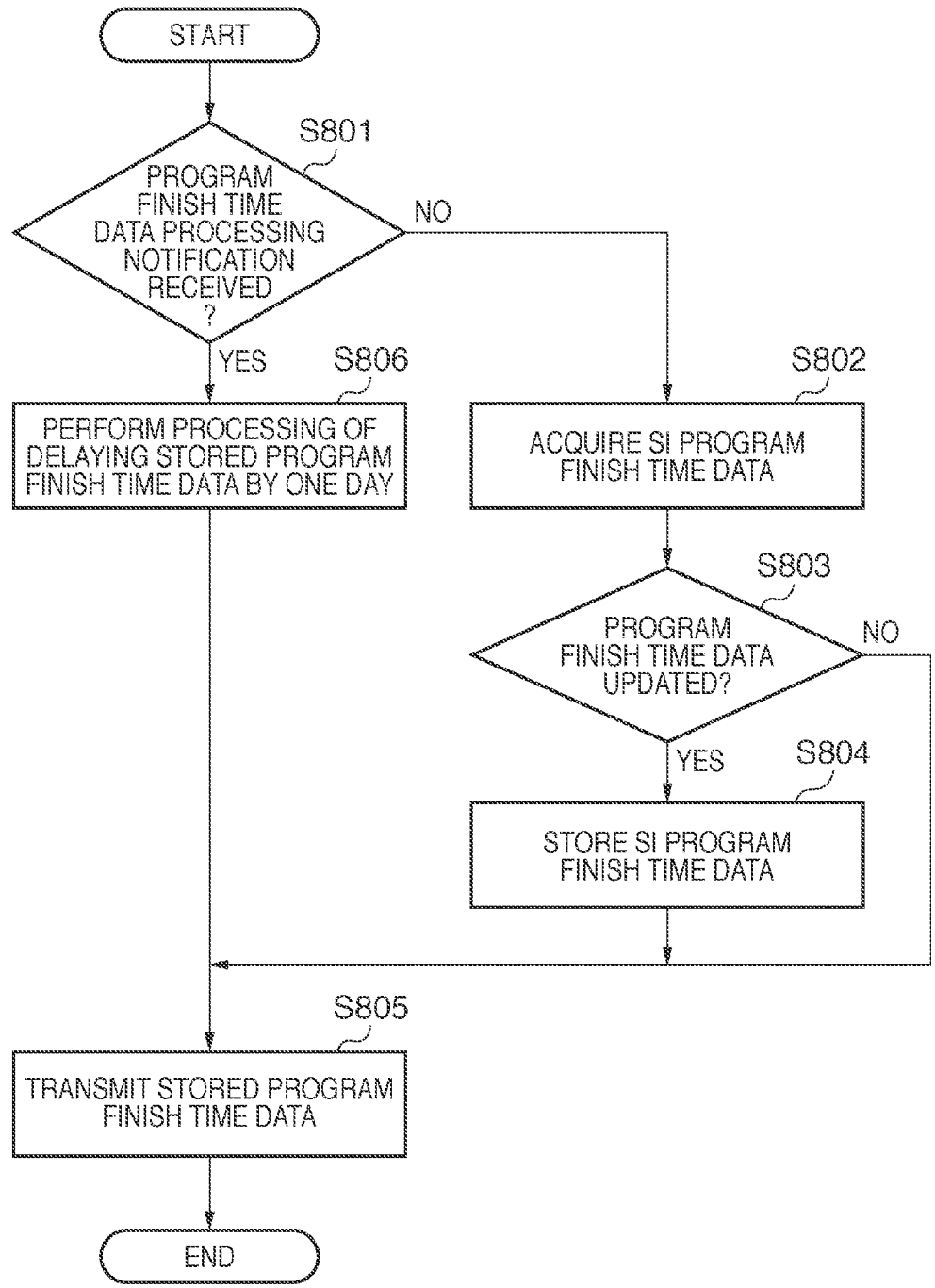
FIG. 8 is a flowchart illustrating processing performed by a program finish time data processing unit 602.

FIG. 8 is a flowchart illustrating processing performed by the program finish time data processing unit 602. The program finish time data processing unit 602 regularly starts the processing shown by this flowchart. At step S801, the program finish time data processing unit 602 determines whether or not a notification about the processing of data on a broadcast program finish time has been received from the application continuation control unit 601. When the notification has been received, the processing goes to step S806; when the notification has not been received, the processing goes to step S802.

At steps S802 to S805, the program finish time data processing unit 602 performs processing of sending the data on the broadcast program finish time to the application execution unit 110 as in the case of the first embodiment. That is, at step S802, the program finish time data processing unit 602 acquires the broadcast program finish time data from the SI acquisition unit 112. At step S803, the program finish time data processing unit 602 determines whether or not the broadcast program finish time data is updated as compared with the previous finish time data. When the data has been updated, the processing goes to step S804; when no updating has been performed, the processing goes to step S805. At step S804, the program finish time data processing unit 602 stores the new (updated) program finish time data. At step S805, the program finish time data processing unit 602 transmits the program finish time data stored therein to the application execution unit 110.

On the other hand, at step S806, the program finish time data processing unit 602 changes the program finish time recorded at step S804 to an advanced time. The changed time is a time advanced by one day after the time before the change, for example, but not limited to such a time. Therefore time data transmitted at step S805 indicates the time advanced from the actual program finish time. Thus, when the broadcast program is actually finished, the application execution unit 110 does not detect the finish, whereby the execution of the application program is continued.

Third Embodiment

Figure 9:
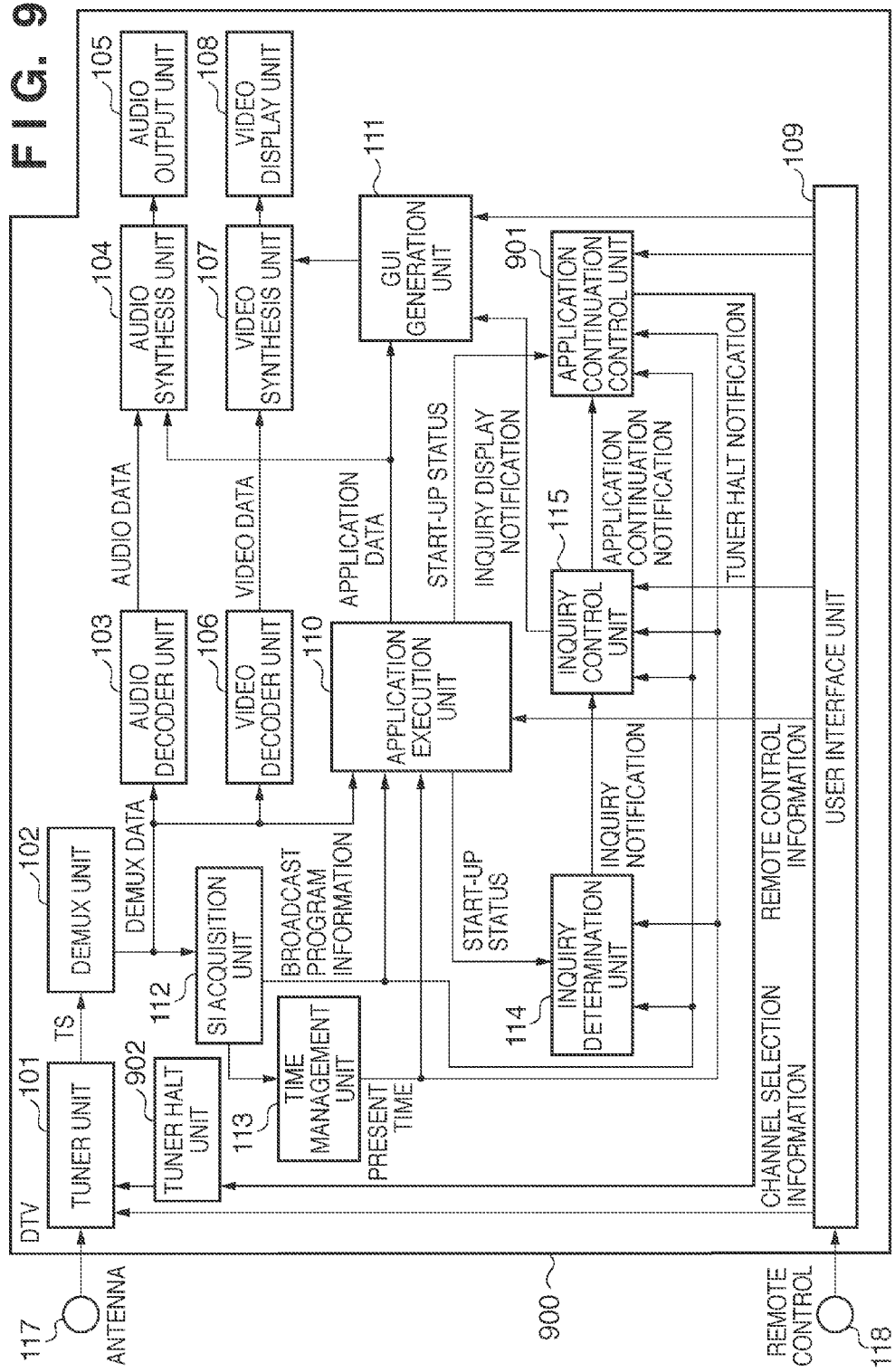
FIG. 9 is a block diagram of a DTV 900 according to a third embodiment.

In a third embodiment, by halting the reception of broadcast program data at the tuner unit 101 before the finish of the broadcast program, switching to another program is circumvented, and a data broadcasting application program can be continuously executed. FIG. 9 is a block diagram of a DTV 900 according to the third embodiment. In FIG. 9, the identical or similar components to those of FIG. 1 are represented by using the same reference numerals, and their descriptions are omitted.

The DTV 900 is different from the DTV 100 in the following. First, the DTV 900 is provided with an application continuation control unit 901; however, the application continuation control unit 901 sends no notification about the updating of the bound flag to the application execution unit 110, and does not control the video synthesis unit 107 and the audio synthesis unit 104. Instead, the application continuation control unit 901 sends a tuner halt notification to a tuner halt unit 902. Second, the DTV 900 is provided with the tuner halt unit 902.

Figure 10:
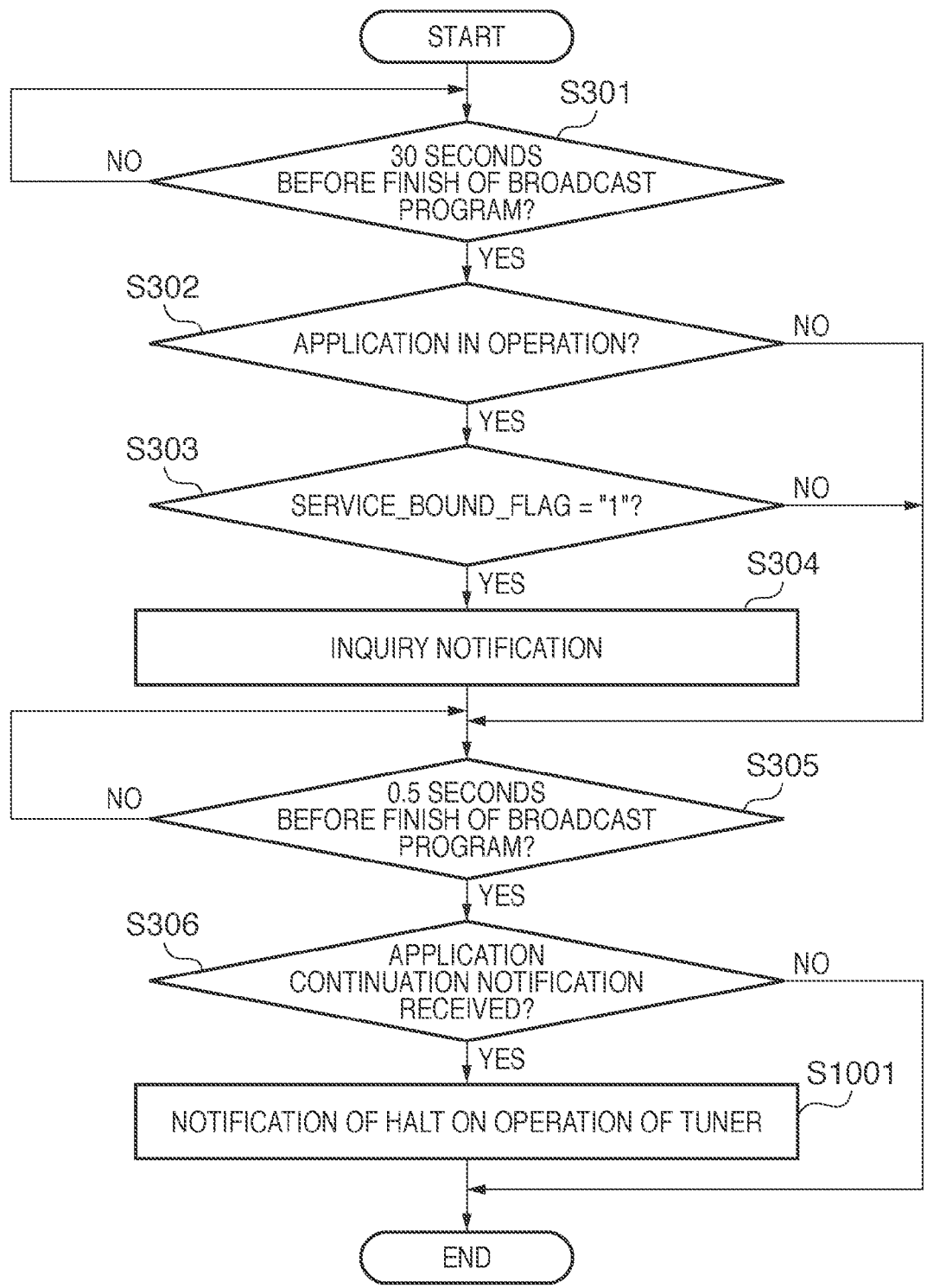
FIG. 10 is a flowchart illustrating application program continuation processing according to the third embodiment.

FIG. 10 is a flowchart illustrating application program continuation processing according to the third embodiment. In FIG. 10, steps at which the identical or similar processing to that in FIG. 3 is performed are represented by using the same step numbers, and the descriptions of the steps are omitted. At step S1001, the application continuation control unit 901 sends a tuner halt notification to the tuner halt unit 902. When the tuner halt notification from the application continuation control unit 901 is received, the tuner halt unit 902 turns off the power to the tuner unit 101 to halt the reception of broadcast program data; or the tuner halt unit 902 may make packets of a TS outputted from the tuner unit 101 null, thereby halting the tuner unit 101. Regarding the halt of the tuner unit 101, it is sufficient that the TS output of the tuner unit 101 is not produced, and thus a concrete method for the halt is not particularly limited.

The application execution unit 110 detects the start of another service (switching to another broadcast program) based on a change in "event_name_char" (a descriptor indicating the titles of broadcast programs) included in EIT "short_event_descriptor"; or the application execution unit 110 detects the start of another service based on a change in EIT [p/f] (present/following: the present and following broadcast program information). In this embodiment, since the operation of the tuner unit 101 is halted at step S1001, the application execution unit 110 cannot acquire SI from the SI acquisition unit 112. Therefore the application execution unit 110 cannot detect the start of another service, and thus the execution of the application program is further continued after the finish of the program. Note that a method for detecting the start of another service is not limited to the method using such an EIT.

Fourth Embodiment

Figure 11:
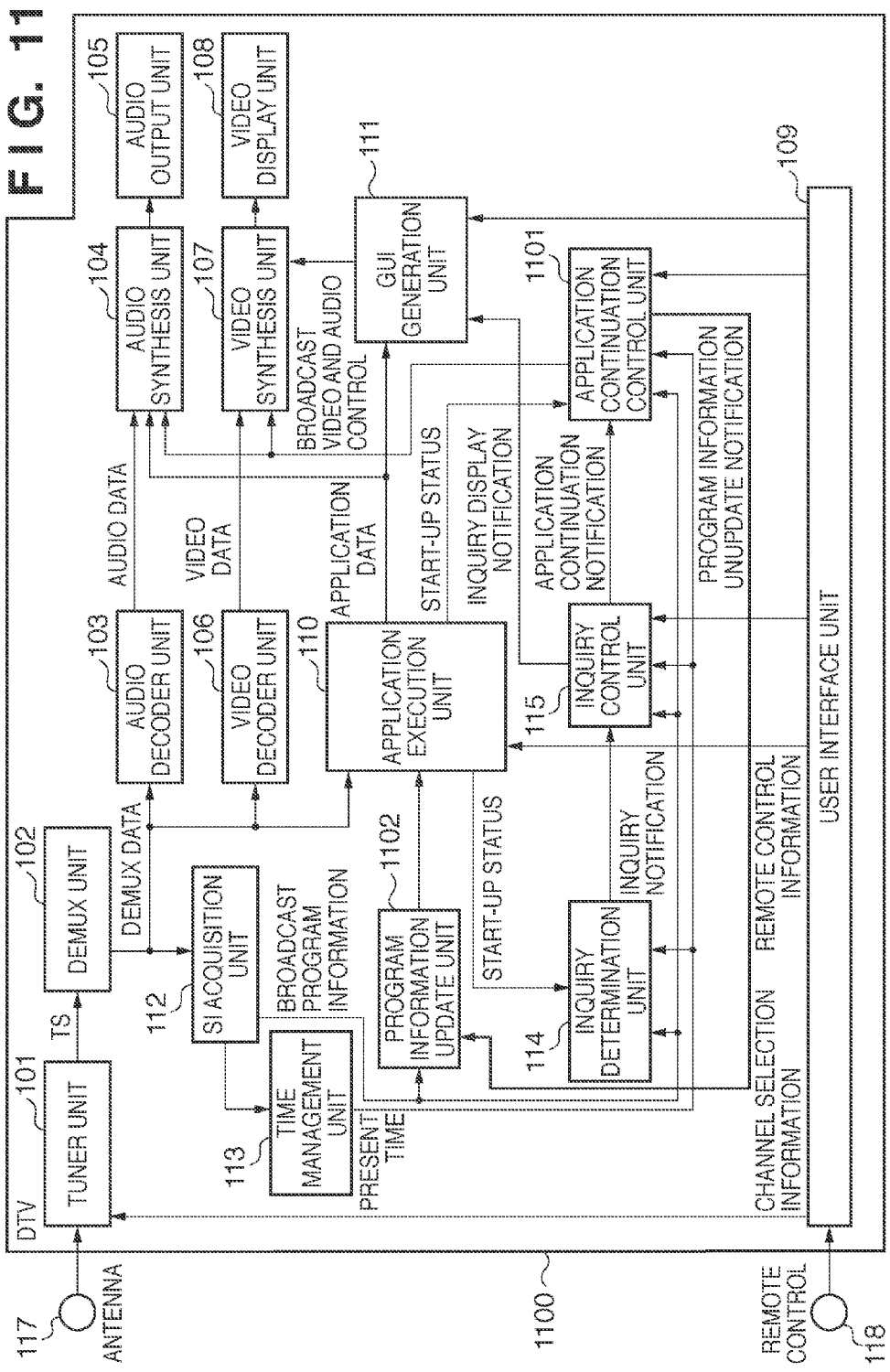
FIG. 11 is a block diagram of a DTV 1100 according to a fourth embodiment.

In a fourth embodiment, by not updating broadcast program information (broadcast program identifying information) included in the SI even after the finish of the program, the start of another service is not simulatively performed, and a data broadcast application program can be continuously executed. FIG. 11 is a block diagram of a DTV 1100 according to the fourth embodiment. In FIG. 11, the identical or similar components to those of FIG. 1 are represented by using the same reference numerals, and their descriptions are omitted.

The DTV 1100 is different from the DTV 100 in the following. First, the DTV 1100 is provided with an application continuation control unit 1101; however, the application continuation control unit 1101 sends no notification about the updating of the bound flag to the application execution unit 110. Instead, the application continuation control unit 1101 sends a notification about the non-updating of broadcast program information to a program information update unit 1102. Second, the DTV 1100 is provided with the program information update unit 1102. Third, the time management unit 113 does not notify the application execution unit 110 of the present time (may do so, of course).

Figure 12:
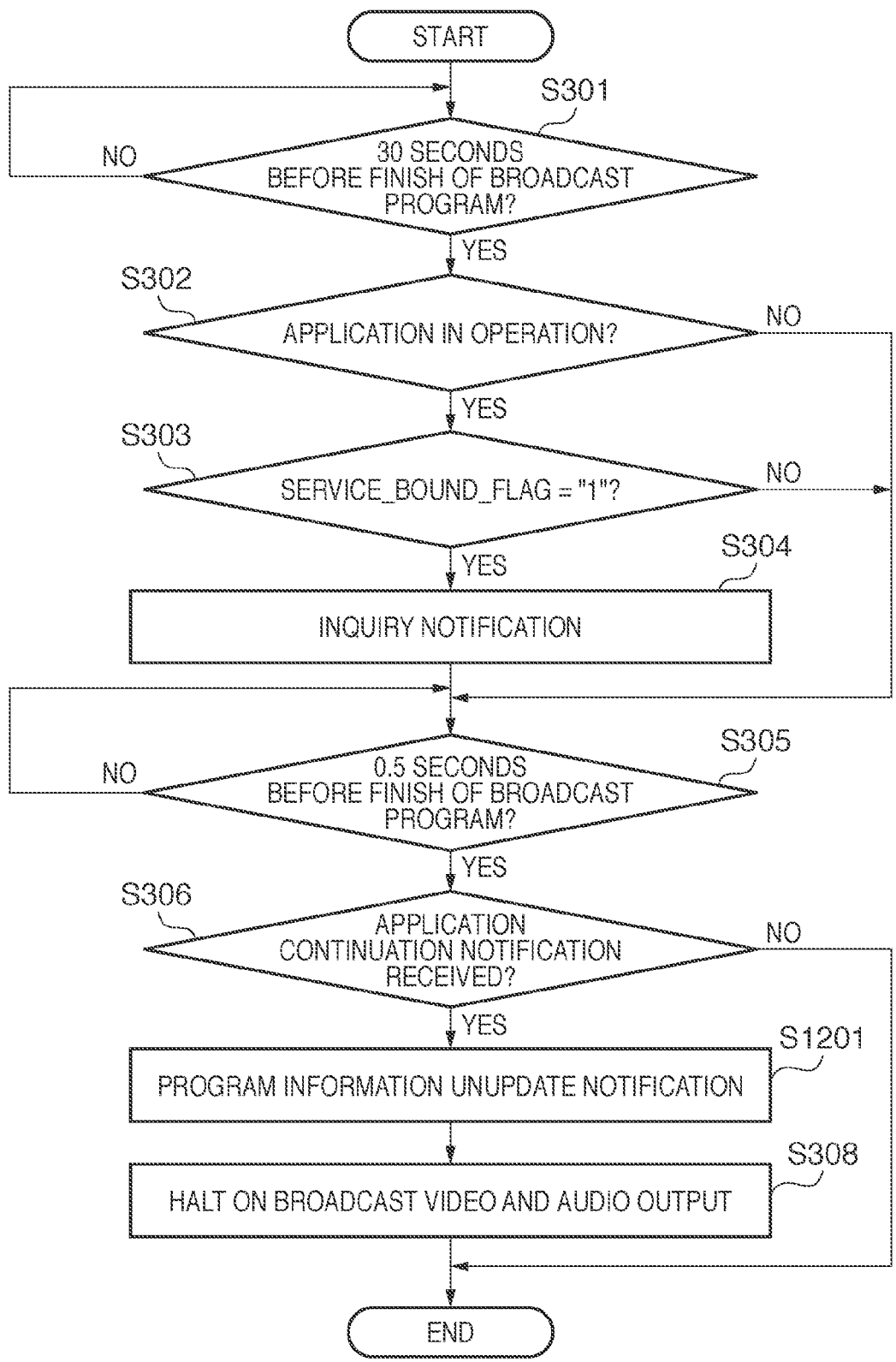
FIG. 12 is a flowchart illustrating application program continuation processing according to the fourth embodiment.

FIG. 12 is a flowchart illustrating application program continuation processing according to the fourth embodiment. In FIG. 12, steps at which the identical or similar processing to that in FIG. 3 is performed are represented by using same step numbers, and the descriptions of the steps are omitted. At step S1201, the application continuation control unit 1101 sends a program information non-update notification to the program information update unit 1102.

Figure 13:
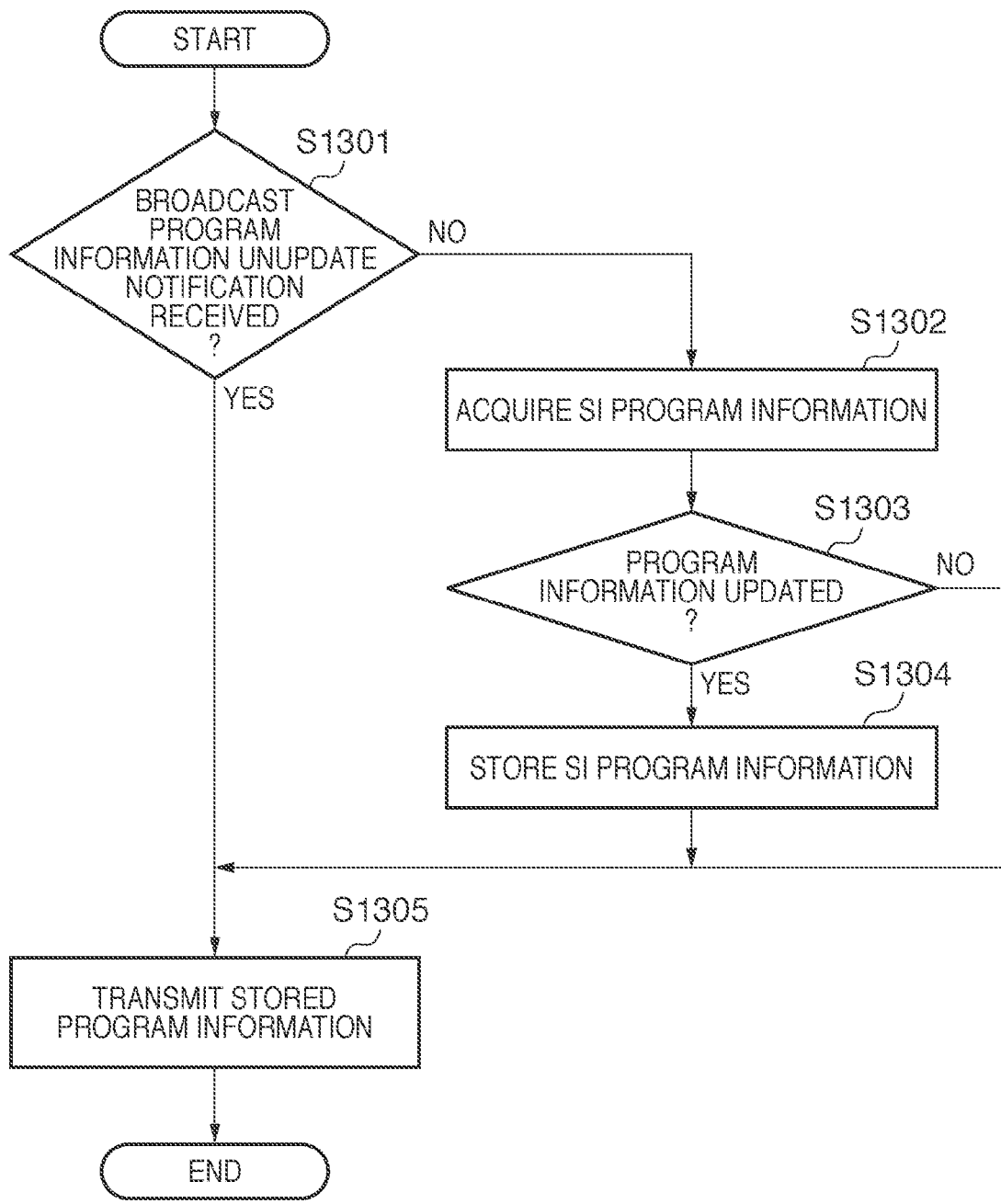
FIG. 13 is a flowchart illustrating processing performed by a program information update unit 1102.

FIG. 13 is a flowchart illustrating processing performed by the program information update unit 1102. The program information update unit 1102 regularly starts the processing shown by this flowchart. At step S1301, the program information update unit 1102 determines whether or not a program information non-update notification from the application continuation control unit 1101 has been received. When the notification has been received, the processing goes to step S1305; when no notification has been received, the processing goes to step S1302.

At steps S1302 to S1305, as in the cases of the foregoing embodiments, the program information update unit 1102 obtains broadcast program information, and then transmits the information to the application execution unit 110. That is, at step S1302, the program information update unit 1102 obtains broadcast program information from the SI acquisition unit 112. At step S1303, the program information update unit 1102 determines whether or not the program information has been updated after the previous acquisition. When the update has been performed, the processing goes to step S1304; when no update has been performed, the processing goes to step S1305. At step S1304, the program information update unit 1102 stores the new (updated) broadcast program information. At step S1305, the program information update unit 1102 transmits the stored program information to the application execution unit 110.

On the other hand, when it is determined that "the broadcast program information non-update notification has been received" at step S1301, the processing at steps S1302 to S1304 is not executed. Because of this, the program information transmitted at step S1305 does not change even when switching to another broadcast program has been actually performed. Therefore, when a broadcast program is actually finished, the application execution unit 110 does not detect switching to another program, and thus the execution of an application program is continued.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-013638, filed on Jan. 25, 2010, which is hereby incorporated by reference herein in its entirety.

What is claimed is:

1. A digital broadcast receiving apparatus comprising:
a reception unit configured to receive broadcast program data including a data broadcast application and subsidiary information;
a playback unit configured to playback the broadcast program data; and
an execution unit configured to execute the data broadcast application,
wherein the subsidiary information includes application control information indicating "finishing" or "not finishing" the execution of the data broadcast application by the execution unit when a program included in the broadcast program data in playback by the playback unit has been switched to another program,
the digital broadcast receiving apparatus further comprising:
an acceptance unit configured to accept a continuation instruction indicating continuing the execution of the data broadcast application by the execution unit even after a program included in the broadcast program data in playback by the playback unit is finished; and
a change unit configured to, when the application control information has indicated "finishing" and the acceptance unit has accepted the continuation instruction, change the application control information so as to indicate "not finishing" before the program included in the broadcast program data in playback by the playback unit is finished.

2. A digital broadcast receiving apparatus comprising:
a reception unit configured to receive broadcast program data including a data broadcast application and subsidiary information;
a playback unit configured to playback the broadcast program data; and
an execution unit configured to execute the data broadcast application,
wherein the subsidiary information includes: application control information indicating "finishing" or "not finishing" the execution of the data broadcast application by the execution unit when a program included in the broadcast program data in playback by the playback unit has been switched to another program; and time information indicating finish time of the program included in the broadcast program data,
the digital broadcast receiving apparatus further comprising:
an acceptance unit configured to accept a continuation instruction indicating continuing the execution of the data broadcast application by the execution unit even after a program included in the broadcast program data in playback by the playback unit is finished; and
a change unit configured to, when the application control information has indicated "finishing" and the acceptance unit has accepted the continuation instruction, change the time information so as to indicate finish time advanced from the pre-changed finish time before the program included in the broadcast program data in playback by the playback unit is finished.

3. A digital broadcast receiving apparatus comprising:
a reception unit configured to receive broadcast program data including a data broadcast application and subsidiary information;
a playback unit configured to playback the broadcast program data; and
an execution unit configured to execute the data broadcast application, wherein the subsidiary information includes application control information indicating "finishing" or "not finishing" the execution of the data broadcast application by the execution unit when a program included in the broadcast program data in playback by the playback unit has been switched to another program, the digital broadcast receiving apparatus further comprising:

an acceptance unit configured to accept a continuation instruction indicating continuing the execution of the data broadcast application by the execution unit even after a program included in the broadcast program data in playback by the playback unit is finished; and a control unit configured to, when the application control information has indicated "finishing" and the acceptance unit has accepted the continuation instruction, control the reception unit so as to halt the reception of the broadcast program data before the program included in the broadcast program data in playback by the playback unit is finished.

4. A digital broadcast receiving apparatus comprising:

a reception unit configured to receive broadcast program data including a data broadcast application and subsidiary information;

a playback unit configured to playback the broadcast program data; and an execution unit configured to execute the data broadcast application, wherein the subsidiary information includes: application control information indicating "finishing" or "not finishing" the execution of the data broadcast application by the execution unit when a program included in the broadcast program data in playback by the playback unit has been switched to another program; and identifying information with which the program included in the broadcast program data is identified, the digital broadcast receiving apparatus further comprising:

a notification unit configured to notify the execution unit of the identifying information;

an acceptance unit configured to accept a continuation instruction indicating continuing the execution of the data broadcast application by the execution unit even after a program included in the broadcast program data in playback by the playback unit is finished; and a control unit configured to, when the application control information has indicated "finishing" and the acceptance unit has accepted the continuation instruction, control the notification unit so as to notify the execution unit of the identifying information of the program included in the broadcast program data in playback by the playback unit even after the program is finished.

5. A method for controlling a digital broadcast receiving apparatus, the method comprising:

a reception step of receiving broadcast program data including a data broadcast application and subsidiary information;

a playback step of playbacking the broadcast program data; and an execution step of executing the data broadcast application, wherein the subsidiary information includes application control information indicating "finishing" or "not finishing" the execution of the data broadcast application at the execution step when a program included in the broadcast program data in playback at the playback step has been switched to another program, the controlling method further comprising:

an acceptance step of accepting a continuation instruction indicating continuing the execution of the data broadcast application at the execution step even after a program included in the broadcast program data in playback at the playback step is finished; and a change step of, when the application control information has indicated "finishing" and the continuation instruction has been accepted at the acceptance step, changing the application control information so as to indicate "not finishing" before the program included in the broadcast program data in playback at the playback step is finished.

6. A method for controlling a digital broadcast receiving apparatus, the method comprising:

a reception step of receiving broadcast program data including a data broadcast application and subsidiary information;

a playback step of playbacking the broadcast program data; and an execution step of executing the data broadcast application, wherein the subsidiary information includes: application control information indicating "finishing" or "not finishing" the execution of the data broadcast application at the execution step when a program included in the broadcast program data in playback at the playback step has been switched to another program; and time information indicating finish time of a program included in the broadcast program data, the controlling method further comprising:

an acceptance step of accepting a continuation instruction indicating continuing the execution of the data broadcast application at the execution step even after a program included in the broadcast program data in playback at the playback step is finished; and a change step of, when the application control information has indicated "finishing" and the continuation instruction has been accepted at the acceptance step, changing the time information so as to indicate finish time advanced from the pre-changed finish time before the program included in the broadcast program data in playback at the playback step is finished.

7. A method for controlling a digital broadcast receiving apparatus, the method comprising:

a reception step of receiving broadcast program data including a data broadcast application and subsidiary information;

a playback step of playbacking the broadcast program data; and an execution step of executing the data broadcast application, wherein the subsidiary information includes application control information indicating "finishing" or "not finishing" the execution of the data broadcast application at the execution step when a program included in the broadcast program data in playback at the playback step has been switched to another program, the controlling method further comprising:

an acceptance step of accepting a continuation instruction indicating continuing the execution of the data broadcast application at the execution step even after a program included in the broadcast program data in playback at the playback step is finished; and a control step of, when the application control information has indicated "finishing" and the continuation instruction has been accepted at the acceptance step, controlling the reception step so that the reception of the broadcast program data is halted before the program included in the broadcast program data in playback at the playback step is finished.

8. A method for controlling a digital broadcast receiving apparatus, the method comprising:
   a reception step of receiving broadcast program data including a data broadcast application and subsidiary information;
   a playback step of playbacking the broadcast program data; and
   an execution step of executing the data broadcast application,
   wherein the subsidiary information includes: application control information indicating "finishing" or "not finishing" the execution of the data broadcast application at the execution step when a program included in the broadcast program data in playback at the playback step has been switched to another program; and identifying information with which the programs included in the broadcast program data are identified,
   the controlling method further comprising:
   a notification step of notifying the execution step of the identifying information;
   an acceptance step of accepting a continuation instruction indicating continuing the execution of the data broadcast application at the execution step even after a program included in the broadcast program data in playback at the playback step is finished; and
   a control step of, when the application control information has indicated "finishing" and the continuation instruction has been accepted at the acceptance step, controlling the notification step so that the execution step is notified of the identifying information of the program included in the broadcast program data in playback at the playback step even after the program is finished.

* * * * *